(12) United States Patent
Ootani et al.

(10) Patent No.: US 10,967,581 B2
(45) Date of Patent: Apr. 6, 2021

(54) RUBBER CORE CORD JOINING STRUCTURE, AND SOLIDIFYING AGENT FOR JOINING RUBBER CORE CORD

(71) Applicant: EIKO ENTERPRISE CO., LTD, Osaka (JP)

(72) Inventors: Takesaburou Ootani, Osaka (JP); Akira Eboshida, Hiroshima (JP); Yoshinori Tatsumi, Osaka (JP)

(73) Assignee: EIKO ENTERPRISE CO., LTD, Osaka (JP)

( * ) Notice: Subject to any disclaimer, the term of this patent is extended or adjusted under 35 U.S.C. 154(b) by 88 days.

(21) Appl. No.: 16/307,085

(22) PCT Filed: Dec. 15, 2017

(86) PCT No.: PCT/JP2017/045129
§ 371 (c)(1),
(2) Date: Dec. 4, 2018

(87) PCT Pub. No.: WO2018/110698
PCT Pub. Date: Jun. 21, 2018

(65) Prior Publication Data
US 2019/0111631 A1   Apr. 18, 2019

(30) Foreign Application Priority Data

Dec. 16, 2016 (JP) .............................. JP2016-244005

(51) Int. Cl.
| | | |
|---|---|---|
| *B29C 65/48* | (2006.01) | |
| *B29C 65/00* | (2006.01) | |
| *A45D 8/36* | (2006.01) | |
| *D04C 1/02* | (2006.01) | |
| *D04C 1/12* | (2006.01) | |

(Continued)

(52) U.S. Cl.
CPC ............ *B29C 65/4895* (2013.01); *A45D 8/36* (2013.01); *B29C 65/48* (2013.01); *B29C 66/114* (2013.01);
(Continued)

(58) Field of Classification Search
CPC ... B29C 65/4895; B29C 66/114; B29C 66/71; B29C 65/48; A45D 8/36; D04C 1/02; D04C 1/12; D04C 1/06; B65D 63/10
See application file for complete search history.

(56) References Cited

U.S. PATENT DOCUMENTS

2015/0238436 A1   8/2015   Urushihara et al.

FOREIGN PATENT DOCUMENTS

| CN | 103074009 B | 1/2015 |
|---|---|---|
| CN | 104661657 A | 5/2015 |

(Continued)

OTHER PUBLICATIONS

European Patent Office "extended European search report" from counterpart EP Application No. 17 880 323.5, 10 pp., dated Dec. 11, 2019.

(Continued)

*Primary Examiner* — Michael C Miggins
(74) *Attorney, Agent, or Firm* — Eckert Seamans Cherin & Mellott, LLC

(57) ABSTRACT

The present invention provides a joining structure with a joining strength higher than that of a conventional rubber core cord joining structure of a rubber ring. The invention also provides a solidifying agent for joining a rubber core cord that provides such a joining structure. A joining structure 2 of a rubber core cord 11 according to the present invention is a rubber core cord joining structure of which opposite end portions of the rubber core cord 11 or end portions of two rubber core cords are joined to each other with an adhesive. A solidified portion 23 formed by a solidifying agent 25 that has solidified is formed at each of the opposite end portions of the rubber core cord 11 or each of the end portions of the two rubber core cords, and the solidified portion 23 contains porous particles. The solidifying agent 25 according to the present invention is a solidifying agent that is applied to the rubber core cord 11, and contains a solvent containing a solidification component and porous particles contained in the solvent.

9 Claims, 6 Drawing Sheets

(51) Int. Cl.
*B65D 63/10* (2006.01)
*D04C 1/06* (2006.01)

(52) U.S. Cl.
CPC .............. *B29C 66/71* (2013.01); *B65D 63/10* (2013.01); *D04C 1/02* (2013.01); *D04C 1/06* (2013.01); *D04C 1/12* (2013.01)

(56) References Cited

FOREIGN PATENT DOCUMENTS

| | | | |
|---|---|---|---|
| JP | 8-308628 | A | 11/1996 |
| JP | 10-291558 | A | 11/1998 |
| JP | 2005-40173 | A | 2/2005 |
| JP | 2007-224310 | A | 9/2007 |
| JP | 3160967 | U | 6/2010 |
| JP | 2014-90953 | A | 5/2014 |
| JP | 2016-34317 | A | 3/2016 |
| KR | 100750876 | B | 11/2006 |

OTHER PUBLICATIONS

Japanese Patent Office, "International Search Report" (with English language translation), from corresponding publication WO 2018/110698 (PCT/JP20171045129), dated Feb. 6, 2018, 3 pp.

Korean Intellectual Property Office, "Office Action" (with English language machine translation) from counterpart KR Application No. 10-2018-7035432, 10 pp., dated Jan. 20, 2020.

Japanese Patent Office, "Office Action" (with English language machine translation) from counterpart JP Application No. 2016-244005, 6 pp., Jan. 2020.

China National Intellectual Property Administration, "Office Action" (with English language machine translation) from counterpart CN Application No. 201780003540.7, 18 pp., Sep. 2, 2020.

(a)

(b)

(c)

(d)

RUBBER CORE CORD JOINING STRUCTURE, AND SOLIDIFYING AGENT FOR JOINING RUBBER CORE CORD

TECHNICAL FIELD

The present invention relates primarily to a joining structure that joins opposite end portions of a rubber core cord to each other or joins end portions of two rubber core cords to each other. The present invention also relates to a solidifying agent that is used to form such a rubber core cord joining structure.

BACKGROUND ART

An annular rubber ring formed by joining opposite end portions of a rubber core cord (also referred to as a rubber core braid) to each other is used as a hair band or an accessory. The rubber core cord includes one or more rubber cores and a stretchable cover that covers the rubber cores, and the stretchable cover is formed by braiding fiber yarns.

To produce a rubber ring as described above, a solidifying agent (also referred to as a "hardener") is applied to opposite end portions of a rubber core cord for forming the rubber ring so as to solidify the opposite end portions, or a solidifying agent is locally applied to a long rubber core cord so as to form solidified portions, and then the long rubber core cord is cut at the solidified portions, thus obtaining a rubber core cord for forming the rubber ring (Patent Documents 1 and 2). As a result of the opposite end portions of the rubber core cord for forming the rubber ring being solidified by the solidifying agent, at the end portions, a situation in which the fiber yarns at the end portions of the stretchable cover are napped, or in which the end faces of the rubber core recede from the end portions of the stretchable cover is prevented or suppressed. Furthermore, as a result of the opposite end portions of the rubber core cord being solidified by the solidifying agent as described above, the opposite end portions can be easily joined to each other using an adhesive, and the joining strength of the opposite end portions is improved.

CITATION LIST

Patent Document

[Patent Document 1] JP 2016-34317A
[Patent Document 2] JP 2005-40173A

SUMMARY OF INVENTION

Technical Problem

It goes without saying that the joining strength of the opposite end portions of the rubber core cord is very important in terms of the function and quality of the rubber ring. Increasing the joining strength of the opposite end portions of the rubber core cord is a constant challenge to manufacturers of rubber rings.

The present invention solves the problem described above, and provides a joining structure with a joining strength higher than that of a rubber core cord joining structure of a rubber ring according to conventional technology. Also, the present invention solves the problem described above, and provides a solidifying agent that realizes such a joining structure with high joining strength in a rubber core cord.

Solution to Problem

The present invention relates to a rubber core cord joining structure of which opposite end portions of a rubber core cord or end portions of two rubber core cords are joined to each other with an adhesive. A solidified portion formed by a solidifying agent that has solidified is formed at each of the opposite end portions of the rubber core cord or each of end portions of the two rubber core cords, and the solidified portion contains porous particles.

The present invention relates to a rubber core cord joining structure of which opposite end portions of a braided or twisted cord formed by braiding or twisting a plurality of rubber core cords or end portions of two braided or twisted cords formed by braiding or twisting a plurality of rubber core cords are joined to each other with an adhesive. A solidified portion formed by a solidifying agent that has been solidified is formed at each of the opposite end portions of the braided or twisted cord or each of the end portions of the two braided or twisted cords, and the solidified portion contains porous particles.

The present invention relates to a solidifying agent that, in order to form a rubber core cord joining structure of which opposite end portions of a rubber core cord or end portions of two rubber core cords are joined to each other with an adhesive, is applied to the opposite end portions of the rubber core cord or the end portions of the two rubber core cords, the solidifying agent including: a solvent containing a solidification component; and porous particles contained in the solvent. The porous particles may be porous polymer particles, porous inorganic particles, charcoal particles, gravel particles, or any mixture thereof. The solidification component may be polyvinyl alcohol, and the solvent may be water.

The present invention relates to a method for producing the rubber core cord joining structure described above, the method including: a step of applying a solidifying agent to opposite end portions of a rubber core cord; or a step of locally applying a solidifying agent to a long rubber core cord, solidifying the solidifying agent to form solidified portions, and then cutting the long rubber core cord at the solidified portions. The solidifying agent contains a solvent containing a solidification component and porous particles contained in the solvent.

The present invention relates to a method for producing the rubber core cord joining structure described above, the method including: a step of locally applying a solidifying agent to a long braided or twisted cord, solidifying the solidifying agent to form solidified portions, and then cutting the long braided or twisted cord at the solidified portions. The solidifying agent contains a solvent containing a solidification component and porous particles contained in the solvent.

Advantageous Effects of Invention

According to the present invention, it is possible to obtain a rubber core cord joining structure with a joining strength higher than that of a rubber core cord joining structure according to conventional technology, as illustrated by the test results shown below.

DESCRIPTION OF EMBODIMENTS

Figure 1:
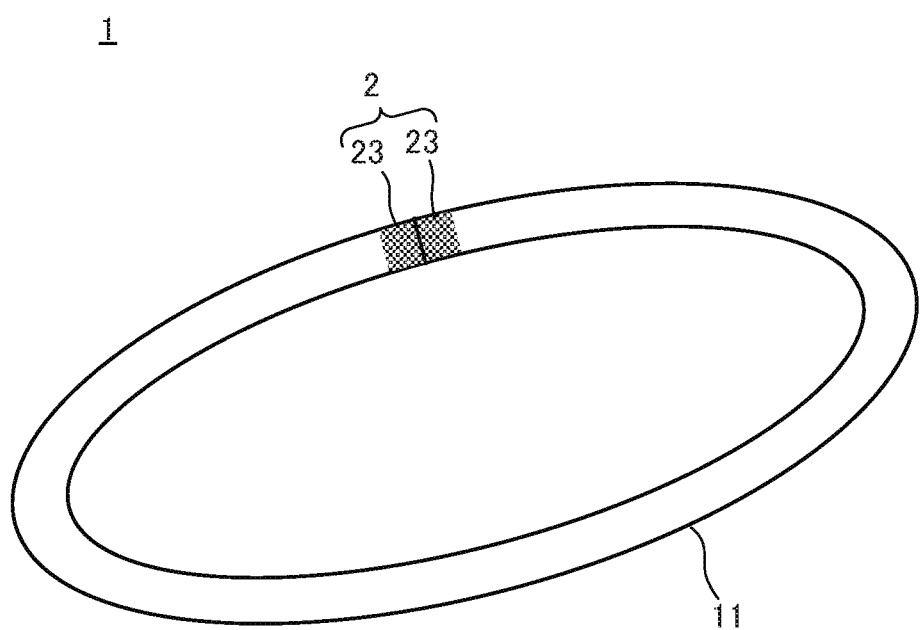
FIG. 1 is a perspective view showing a rubber ring that has a rubber core cord joining structure according to the present invention.
Figure 2:
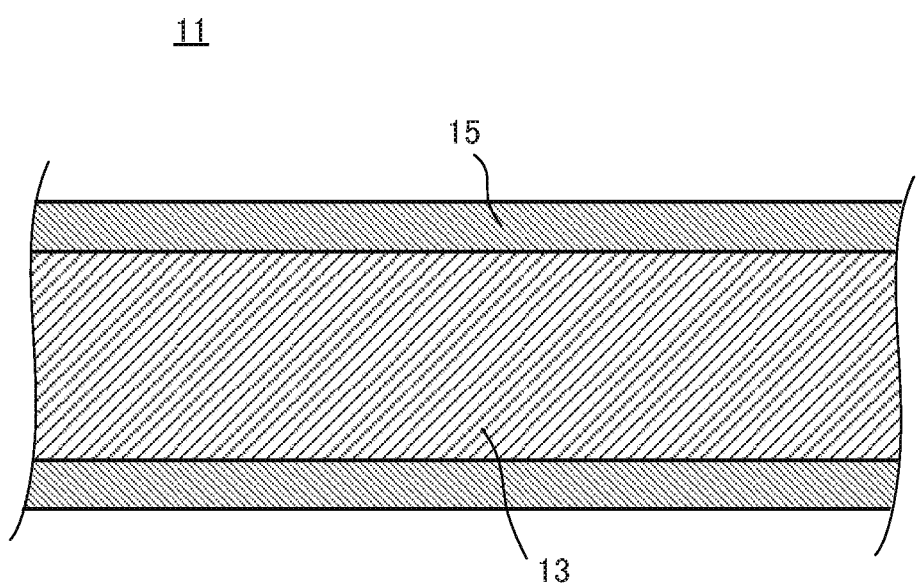
FIG. 2 is a cross-sectional view of a rubber core cord that constitutes the rubber ring shown in FIG. 1.

Hereinafter, the present invention will be described in detail with reference to the drawings. FIG. 1 is a perspective view showing a first rubber ring 1 that has a rubber core cord joining structure according to the present invention, and FIG. 2 is a cross-sectional view of a rubber core cord 11 that constitutes the first rubber ring 1, taken along the lengthwise direction.

The rubber core cord 11 includes an elongated rubber core 13 made of a natural or synthetic rubber and a stretchable cover 15 that covers the rubber core 13. The cross section (taken along a plane perpendicular to the lengthwise direction) of the rubber core 13 has, for example, a rectangular or circular shape, but the shape of the cross section of the rubber core 13 is not limited in the present invention. In the present embodiment, the rubber core cord 11 includes one rubber core 13, but in the present invention, the rubber core cord 11 may be a bundle of rubber core cords held together by a stretchable cover 15.

The stretchable cover 15 is formed by braiding fiber yarns so as to be stretchable in the lengthwise direction of the rubber core cord 11. As the fiber yarn that forms the stretchable cover 15, for example, a cotton yarn, a polyester yarn, a rayon yarn, or a polyurethane yarn can be used.

Figure 3:
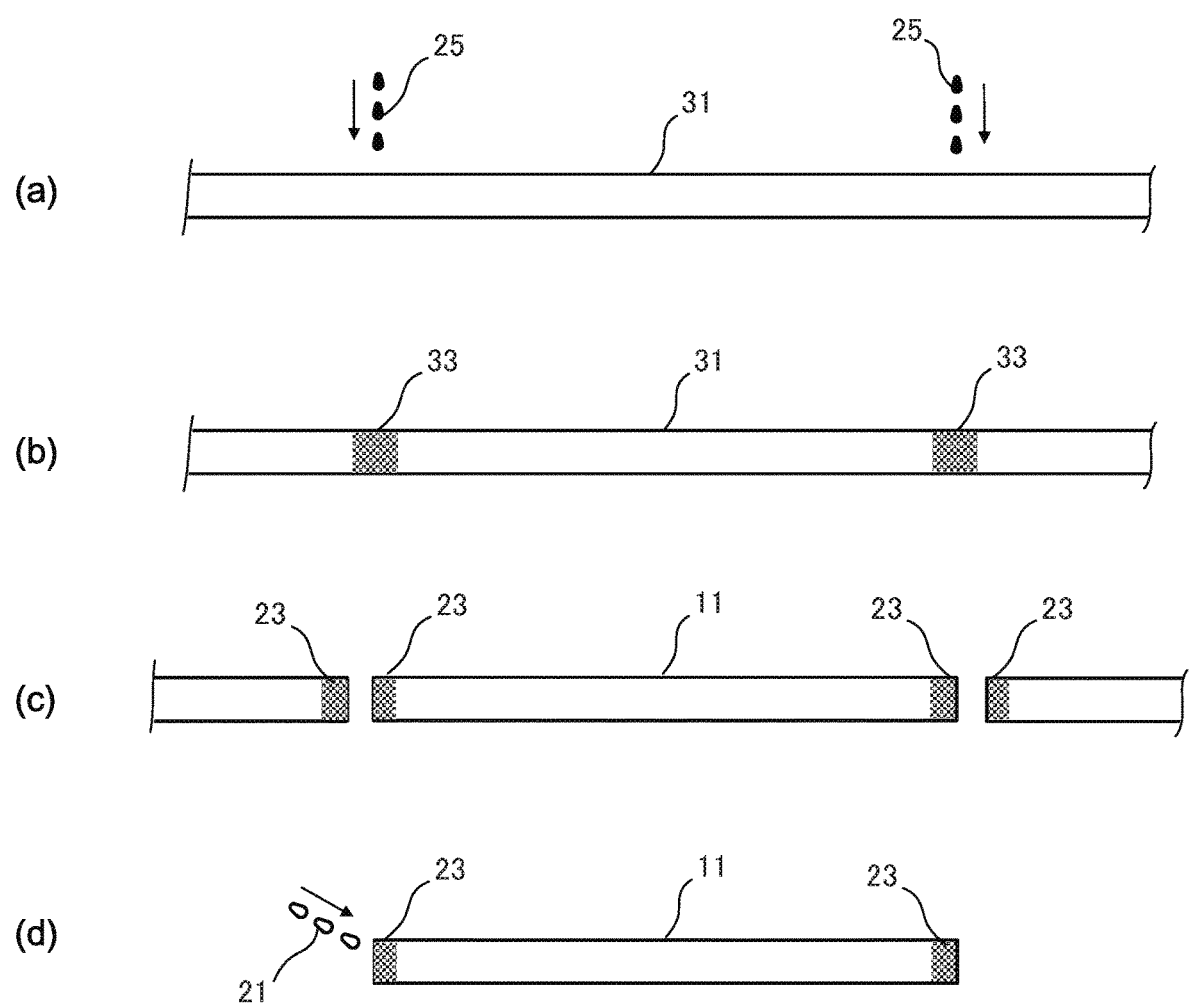
FIGS. 3(a) to 3(d) are diagrams showing a process for producing the rubber ring shown in FIG. 1.

The first rubber ring 1 has a joining structure 2 in which opposite end portions of the rubber core cord 11 are joined to each other with an adhesive 21 (see FIG. 3(d)). The joining structure 2 includes solidified portions 23 formed at the opposite end portions of the rubber core cord 11, and the end faces of the solidified portions 23 at the opposite end portions are joined to each other with the adhesive 21.

The solidified portions 23 of the rubber core cord 11 are formed by applying a solidifying agent 25 to the rubber core cord 11 (see FIG. 3(a)), and solidifying the solidifying agent 25. The solidifying agent 25 contains a solvent containing a solidification component and porous particles contained in the solvent. As the solidification component, it is possible to use polyvinyl alcohol (PVA), cellulose derivatives, polysaccharides, saccharides, glycerin derivatives, polylysine, polyallylamine, polyalkylenepolyamine, polyalkylamine, polyethyleneimine, or the like. Water is used as the solvent. Polyvinyl alcohol and water are usually used as a solidification component and a solvent in a solidifying agent for use in a conventional rubber core cord joining structure.

Furthermore, the solidifying agent 25 may contain an organic solvent-based cleaning agent. The cleaning agent functions to form pores in the solidified portions 23 formed by the solidifying agent 25 as a result of the cleaning agent evaporating. As the organic solvent-based cleaning agent, anone, methanole, methyl ethyl ketone, propylene dichloride, dichloromethane, tetrahydrofuran, toluene, n-heptane, acetone, or the like can be used.

The features of the present invention are that the solidifying agent 25 contains porous particles, and that the solidified portions 23 of the rubber core cord 11 contain porous particles. Examples of the porous particles include porous polymer particles, porous inorganic particles, charcoal particles, gravel particles, any mixture thereof, and the like. However, any porous particles may be used as long as the advantageous effects of the present invention can be obtained. In the present invention, the shape of the porous particles is not limited, and the porous particles may have, for example, a spherical shape or a threadlike shape, or may be fiber powders. In the present invention, it is preferable that the porous particles are fine particles. The particles have an average particle size of, for example, 50 μm or less, but it is possible to use porous particles of any size as long as the advantageous effects of the present invention can be obtained.

Examples of the porous polymer particles that can be used as the porous particles of the present invention include porous particles made of nylon, polyolefin, polyester, polyurethane, polycarbonate, polyether ether ketone, poly(phenyleneoxide) or poly(ethersulfone), and any mixture thereof.

Examples of the porous inorganic particles that can be used as the porous particles of the present invention include porous particles made of silica, alumina, titania or zirconia, and any mixture thereof.

Examples of the charcoal particles that can be used as the porous particles of the present invention include charcoal particles made of black charcoal, white charcoal, bamboo charcoal, or Binchotan charcoal (Japanese high-quality charcoal), and mixtures thereof.

Examples of the gravel particles that can be used as the porous particles of the present invention include: gravel particles obtained by pulverizing a clump of porous natural stone such as tourmaline, zeolite, granite, fossil shells, sun stone, fossil coral, chlorite, Oya stone (volcanic stone found in the town of Oya, Japan), or elvan stone, or a clump of volcanic rock or tuff stone, and sieving the pulverized particles; and any mixture thereof.

As the adhesive 21 that can be used in the present invention to join the end faces of the opposite end portions of the rubber core cord 11, it is preferable to use a permeable and water-insoluble adhesive. For example, a cyanoacrylate-based adhesive can be used.

FIGS. 3(a) to 3(d) are diagrams showing the overall process for producing the first rubber ring 1 shown in FIG. 1. First, as shown in FIG. 3(a), a solidifying agent 25 containing porous particles is applied to a long rubber core cord 31 at portions that are spaced apart from each other. The portions of the rubber core cord 31 where the solidifying agent 25 is applied are spaced apart by a length substantially corresponding to the circumferential length of the first rubber ring 1. Then, as shown in FIG. 3(b), the solidifying agent 25 is solidified, as a result of which solidified portions 33 containing porous particles are formed in the long rubber core cord 31 at the portions that are spaced apart from each other.

After the solidified portions 33 have been formed in the long rubber core cord 31, as shown in FIG. 3(c), the long rubber core cord 31 is cut at each solidified portion 33 so as to obtain a rubber core cord 11 for forming a first rubber ring 1, the rubber core cord 11 having solidified portions 23 at its opposite end portions. Then, as shown in FIG. 3(d), an adhesive 21 is applied to one of the end faces of the rubber core cord 11, and then the opposite end portions of the rubber core cord 11 are brought together. Once the adhesive 21 has solidified, a first rubber ring 1 is obtained.

In the production process shown in FIGS. 3(a) to 3(d) as an example, the solidifying agent 25 is applied to the long rubber core cord 31 at portions that are spaced apart from each other, but instead of this step, a rubber core cord 11 for forming a first rubber ring 1 may be obtained by cutting a long rubber core cord 31. Then, a step of applying a solidifying agent 25 to opposite end portions of the rubber core cord 11 is performed. This step may be performed, for example, by immersing each end portion of the rubber core cord 11 in a solidifying agent 25 contained in a storage container.

Figure 4:
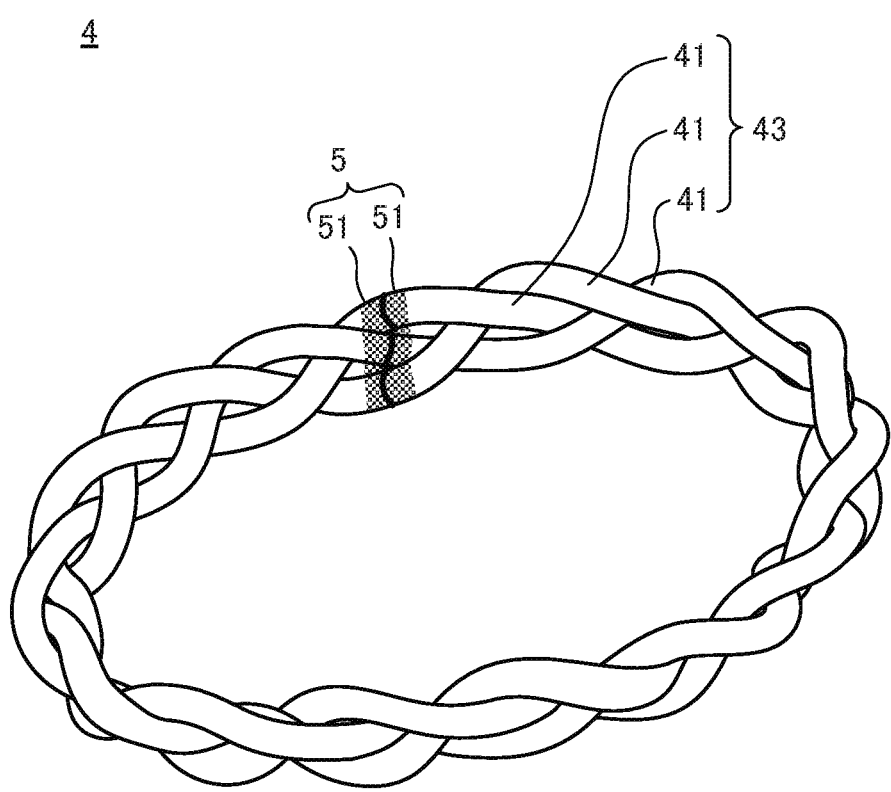
FIG. 4 is a perspective view of a rubber ring that has a rubber core cord joining structure according to the present invention.

FIG. 4 is a perspective view of a second rubber ring 4 that has a rubber core cord joining structure 5 according to the present invention. The second rubber ring 4 is formed by joining opposite end portions of a braided cord 43, which is formed by braiding a plurality of rubber core cords 41, to each other using an adhesive 21. Solidified portions 51 containing porous particles are formed at opposite end portions of the braided cord 43. Each rubber core cord 41 has the same configuration as that of the rubber core cord 11 of the first rubber ring 1 according to the embodiment described above.

In the present embodiment, the braided cord 43 is formed by braiding three rubber core cords 41, but in the present invention, there is no limitation on the number of rubber core cords 41 that constitute the braided cord 43 and the method of braiding the rubber core cords 41. For example, the braided cord 43 may be composed of two rubber core cords 41 that are left-right braided. Alternatively, instead of the braided cord 43, a twisted cord formed by twisting a plurality of rubber core cords 41 together may be used to form the second rubber ring 4.

Figure 5:
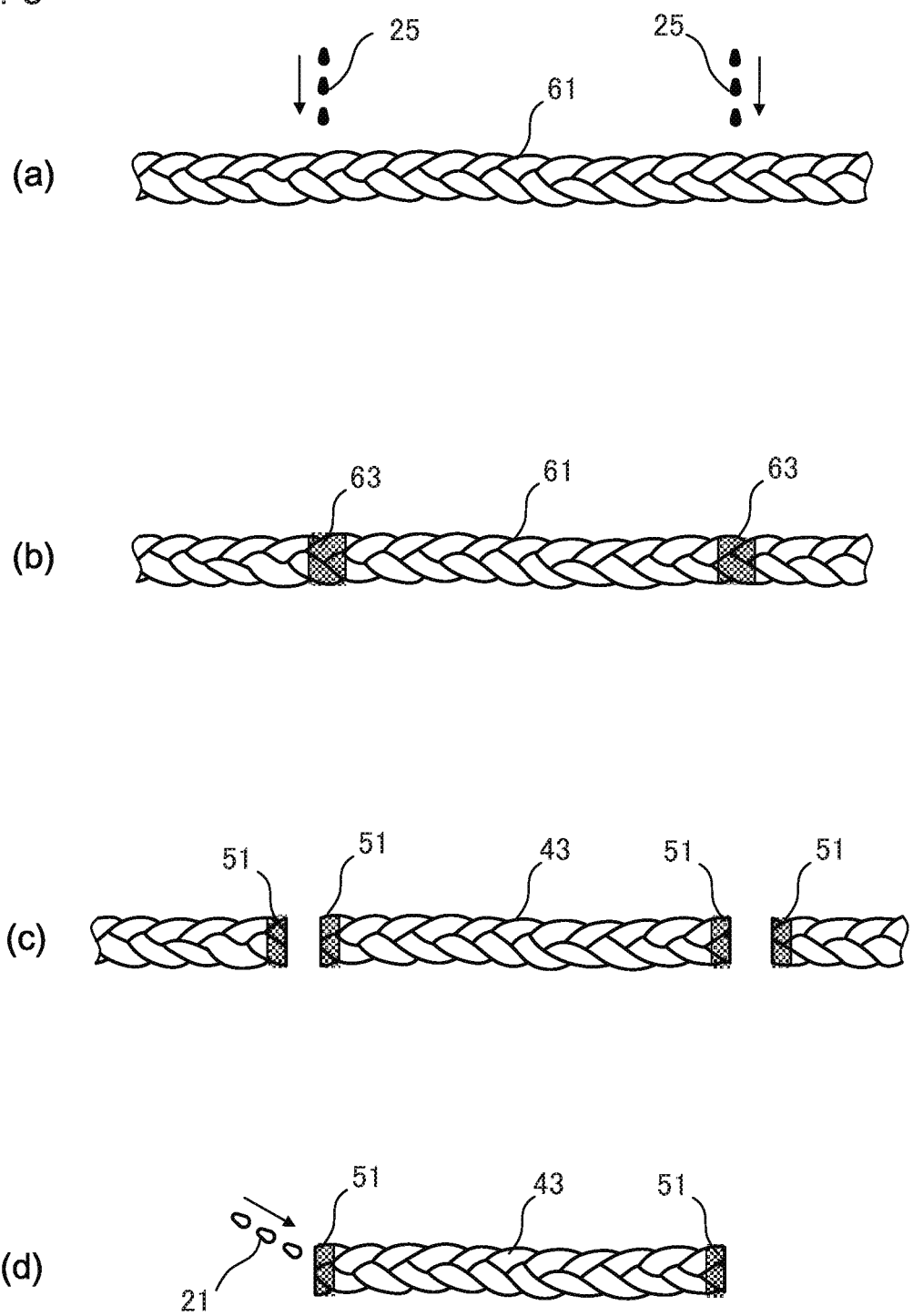
FIGS. 5(a) to 5(d) are diagrams showing a process for producing the rubber ring shown in FIG. 4.

FIGS. 5(*a*) to 5(*d*) are diagrams showing the overall process for producing the second rubber ring 4 shown in FIG. 4. First, as shown in FIG. 5(*a*), a solidifying agent 25 containing porous particles is applied to a long braided cord 61 at portions that are spaced apart from each other. The portions of the braided cord 61 where the solidifying agent 25 is applied are spaced apart by a length substantially corresponding to the circumferential length of the second rubber ring 4. Then, as shown in FIG. 5(*b*), the solidifying agent 25 solidifies, as a result of which solidified portions 63 containing porous particles are formed in the long braided cord 61 at the portions that are spaced apart from each other.

After the solidified portions 63 have been formed in the long braided cord 61, as shown in FIG. 5(*c*), the long braided cord 61 is cut at each solidified portion 63 so as to obtain a braided cord 43 for forming a second rubber ring 4, the braided cord 43 having the solidified portions 51 at its opposite end portions. Then, as shown in FIG. 5(*d*), an adhesive 21 is applied to one of the end faces of the braided cord 43, and then the opposite end portions of the braided cord 43 are joined to each other.

Figure 6:
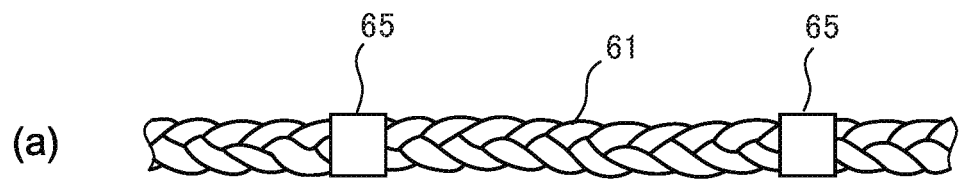
FIGS. 6(a) to 6(d) are diagrams showing a process for producing the rubber ring shown in FIG. 4.
Figure 6:
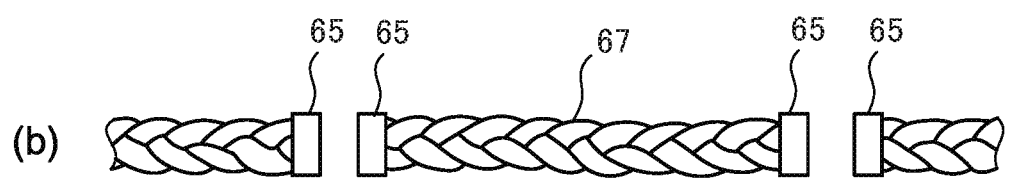
Figure 6:
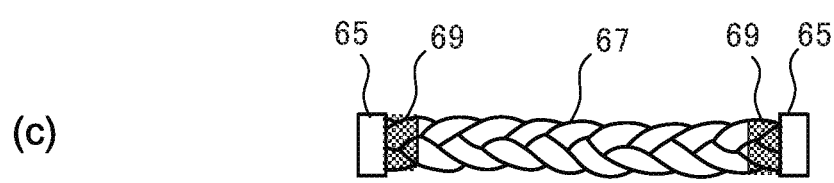
Figure 6:
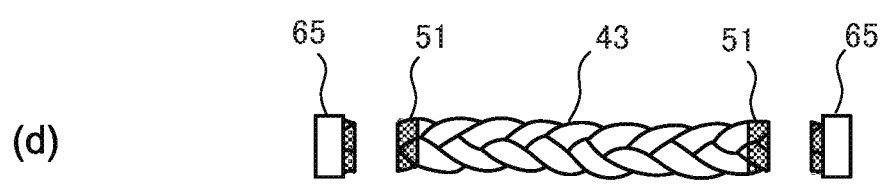

FIG. 6 is a diagram showing another overall process for producing the second rubber ring 4 shown in FIG. 4. First, as shown in FIG. 6(*a*), strip-shaped tearable bundling members 65 are wound around a long braided cord 61 at portions that are spaced apart from each other. The bundling members 65 may be made of any material as long as they can be wound around the braided cord 61 and easily torn. For example, a commercially available pressure sensitive adhesive tape may be used. The portions of the braided cord 61 where the bundling members 65 are wound around are spaced apart by a length longer than the circumferential length of the second rubber ring 4.

Then, as shown in FIG. 6(*b*), each bundling member 65 formed in the long braided cord 61 is torn apart. Then, as shown in FIG. 6(*c*), a solidifying agent (not shown) containing porous particles is applied to at least a portion on the inner side of the remainder of each bundling member 65 of the resulting braided cord 67. The solidifying agent is solidified so as to form solidified portions 69 containing porous particles, and thereafter, as shown in FIG. 6(*d*), the braided cord 67 is cut at the solidified portions 69 so as to obtain a braided cord 43 for forming a second rubber ring 4, the braided cord 43 having the solidified portions 51 at its opposite end portions. Then, as in the step described with reference to FIG. 5(*d*), an adhesive 21 is applied to the end face of one of the solidified portions 51 of the braided cord 43, and the opposite end portions of the braided cord 43 are joined to each other. The step shown in FIG. 6(*c*) may be performed by immersing each end portion of the braided cord 67 in a solidifying agent 25 contained in a storage container.

EXAMPLES

In order to confirm the effects of the present invention, a first rubber ring 1 with a joining structure 2 according to the present invention shown in FIG. 1 was produced by executing the production process described above. The produced first rubber ring 1 had a circumferential length of approximately 16 cm, and a rubber core cord 11 constituting the first rubber ring 1 had a rubber core 13 with a substantially square cross section with each side being approximately 2 mm.

A solidifying agent 25 used to produce the first rubber ring 1 was prepared by adding porous polymer particles, porous inorganic particles, charcoal particles, or gravel particles to a solution containing water as a solvent, polyvinyl alcohol as a solidification component, and acetone as an organic solvent-based cleaning agent (specifically, a mixed solution containing about 50 wt % of water, about 20 wt % of aqueous PVA solution (10%), and about 30 wt % of acetone). The particles were added in an amount of 5 g per 100 ml of the solution. As the porous polymer particles, Nylon 6 porous fine particles (with an average particle size of 13 μm) (available from Toray Industries Inc.) were used. As the porous inorganic particles, Sylysia 350 (with a particle size of about 4 μm) (available from Fuji Silysia Chemical, Ltd.) were used. As the charcoal particles, a mixture of Binchotan charcoal powder and bamboo charcoal powder (with an average particle size of 16.72 μm) (available from Masudaya Co., Ltd.) was used. As the gravel particles, elvan stone powder (with a fineness of 300 mesh) from Fuxin City in the People's Republic of China was used. An adhesive 21 used to produce the first rubber ring 1 was a cyanoacrylate-based adhesive.

Ten samples of the first rubber ring 1 were produced using each of the various types of porous particles, and the joining strength of the joining structure 2 of the first rubber ring 1 was evaluated for each sample. Furthermore, as a Comparative Example, ten rubber rings having the same configuration as that of the first rubber ring 1 apart from the solidifying agent 25 not containing porous particles were produced, and the joining strength of the joining structure was evaluated for each sample. The evaluation of the joining strength was performed by measuring the force required to separate the joined solidified portions in the joining structure of the first rubber ring 1 or the rubber ring joining structure of the Comparative Example. Specifically, a digital force gauge (available from Imada, Co., Ltd.) that has a hook attached to the leading end of a measurement shaft was fixed to a worktable. Then, a sample of the first rubber ring 1 or the rubber ring of Comparative Example was hung on the hook and pulled away from the digital force gauge so as to separate the joined opposite end portions of the rubber core cord. The peak value of the pulling force applied to the sample of the first rubber ring 1 or the rubber ring of Comparative Example (unit: kgf) was recorded by the digital force gauge.

The results of the tests described above are collectively shown in Table 1 given below (the values shown in Table 1 are peak values described above).

TABLE 1

| Sample No. | Comparative Example | Porous Polymer Particles | Porous Inorganic Particles | Charcoal Particles | Gravel Particles |
|---|---|---|---|---|---|
| 1 | 7.0 | 12.9 | 12.6 | 12.8 | 14.7 |
| 2 | 8.2 | 14.7 | 16.7 | 13.5 | 11.6 |
| 3 | 7.6 | 14.8 | 15.2 | 10.9 | 12.5 |
| 4 | 9.1 | 15.4 | 13.1 | 13.3 | 14.7 |
| 5 | 6.5 | 13.6 | 12.7 | 15.2 | 12.0 |
| 6 | 8.1 | 15.9 | 11.1 | 13.5 | 11.7 |
| 7 | 9.7 | 11.6 | 13.8 | 14.1 | 13.1 |
| 8 | 6.2 | 12.5 | 12.6 | 12.3 | 11.5 |
| 9 | 7.8 | 14.8 | 13.3 | 14.4 | 12.6 |
| 10 | 8.2 | 10.1 | 14.3 | 11.8 | 12.3 |
| Average (kgf) | 7.8 | 13.6 | 13.5 | 13.2 | 12.7 |

As shown in Table 1, for the samples of Comparative Example, the average value of the force required to separate the opposite end portions of the rubber core cord was 7.8 kgf, and for the samples obtained by containing porous polymer particles, porous inorganic particles, charcoal particles, or gravel particles in the solidifying agent, the average value was 13.6 kgf, 13.5 kgf, 13.2 kgf, or 12.7 kgf, respectively. When porous polymer particles, porous inorganic particles, charcoal particles, or gravel particles are added to the solidifying agent 25, the force required to separate the opposite end portions of the rubber core cord of the first rubber ring 1 of the present invention is about 1.6 to 1.7 times higher than the force required to separate the opposite end portions of the rubber core cord of the rubber ring of the Comparative Example. As described above, it was actually confirmed that the present invention significantly improves the joining strength of the rubber core cord joining structure of the rubber ring as compared with that of a conventional rubber ring.

In the embodiments described above, the first rubber ring 1 is formed by joining the opposite end portions of the rubber core cord 11 using the present invention, and the second rubber ring 4 is formed by joining the opposite end portions of the braided cord 43 using the present invention. However, it is clear that the present invention may be used to join end portions of two rubber core cords so as to connect the rubber core cords, or may be used to join the end portions of two braided or twisted cords so as to connect the braided or twisted cords.

In the present invention, it is clear that the amount of porous particles contained in the solidified portions of the rubber core cord joining structure or the amount or proportion of porous particles contained in the solidifying agent may be adjusted as appropriate such that the advantageous effects of the present invention can be obtained or as long as the advantageous effects of the present invention can be obtained.

In the present invention, the porous particles contained in the solidified portions of the rubber core cord joining structure, or the porous particles contained in the solidifying agent may be colored with a color that is the same as or similar to the color of the fiber constituting the stretchable cover of the rubber core cord. As a result of the porous particles being colored as described above, in the rubber core cord joining structure, it is possible to conceal the presence of the porous particles. Likewise, the solvent of the solidifying agent may also be colored with a color that is the same as or similar to the color of the fiber constituting the stretchable cover of the rubber core cord.

The foregoing description has been given to illustrate the disclosed invention, and thus should not limit the scope of the invention recited in the appended claims or should not be construed to narrow the scope. Also, of course, the constituent elements of the present invention are not limited to those described in the embodiments given above, and various modifications can be made within the technical scope of the appended claims.

LIST OF REFERENCE NUMERALS

1 Rubber Ring
11 Rubber Core Cord
2 Joining Structure
21 Adhesive
23 Solidified Portion
25 Solidifying Agent
4 Rubber Ring
41 Rubber Core Cord
43 Braided Cord
5 Joining Structure
51 Solidified Portion

The invention claimed is:

1. A rubber core cord joining structure of which opposite end portions of a rubber core cord or end portions of two rubber core cords are joined to each other with an adhesive,
    wherein a solidified portion formed by a solidifying agent that has solidified is formed at each of the opposite end portions of the rubber core cord or each of the end portions of the two rubber core cords, and
    the solidified portion contains porous particles.

2. The rubber core cord joining structure according to claim 1, wherein, the porous particles are porous polymer particles, porous inorganic particles, charcoal particles, gravel particles, or any mixture thereof.

3. A rubber core cord joining structure of which opposite end portions of a braided or twisted cord formed by braiding or twisting a plurality of rubber core cords or end portions of two braided or twisted cords formed by braiding or twisting a plurality of rubber core cords are joined to each other with an adhesive,
    wherein a solidified portion formed by a solidifying agent that has solidified is formed at each of the opposite end portions of the braided or twisted cord or each of the end portions of the two braided or twisted cords, and
    the solidified portion contains porous particles.

4. The rubber core cord joining structure according to claim 3, wherein the porous particles are porous polymer particles, porous inorganic particles, charcoal particles, gravel particles, or any mixture thereof.

5. The rubber core cord joining structure according to claim 1, wherein,
    the solidifying agent comprises:
    a solvent containing a solidification component; and
    porous particles contained in the solvent.

6. The solidifying agent according to claim 5,
    wherein the porous particles are porous polymer particles, porous inorganic particles, charcoal particles, gravel particles, or any mixture thereof.

7. The solidifying agent according to claim 5,
wherein the solidification component is polyvinyl alcohol, and
the solvent is water.

8. A method for producing the rubber core cord joining structure according to claim 1, the method comprising:
providing the solidifying agent;
applying the solidifying agent to the opposite end portions of the rubber core cord or each of the end portions of the two rubber core cords, and solidifying the solidifying agent to form the solidified portion, or
providing a long rubber core cord, locally applying the solidifying agent to the long rubber core cord, solidifying the solidifying agent to form solidified portions, and then cutting the long rubber core cord at the solidified portions to form the rubber core cord having the opposite end portions or the two rubber core cords having end portions wherein the solidified portion is formed at each of the opposite end portions of the rubber core cord or each of the end portions of the two rubber core cords,
wherein the solidifying agent contains a solvent containing a solidification component and porous particles contained in the solvent.

9. A method for producing the rubber core cord joining structure according to claim 3, the method comprising:
providing the solidifying agent;
providing a long braided or twisted cord formed by braiding or twisting a plurality of rubber core cords, locally applying the solidifying agent to the long braided or twisted cord, solidifying the solidifying agent to form solidified portions, and then cutting the long braided or twisted cord at the solidified portions to form the braided or twisted cord having the opposite end portions or the two braided or twisted cords having the end portions wherein the solidified portion is formed at each of the opposite end portions of the braided or twisted cord or each of the end portions of the two braided or twisted cords,
wherein the solidifying agent contains a solvent containing a solidification component and porous particles contained in the solvent.

\* \* \* \* \*